United States Patent [19]

Schimmel et al.

[11] Patent Number: 4,466,948
[45] Date of Patent: Aug. 21, 1984

[54] PROCESS FOR REMOVING HEAVY METAL IONS AND ARSENIC FROM WET-PROCESSED PHOSPHORIC ACID

[75] Inventors: Günther Schimmel, Erftstadt; Reinhard Gradl, Hürth; Gero Heymer, Erftstadt, all of Fed. Rep. of Germany

[73] Assignee: Hoechst Aktiengesellschaft, Fed. Rep. of Germany

[21] Appl. No.: 508,272

[22] Filed: Jun. 24, 1983

[30] Foreign Application Priority Data

Jul. 21, 1982 [DE] Fed. Rep. of Germany ....... 3227202

[51] Int. Cl.$^3$ .................. C01B 25/16; B01D 11/00; C01G 17/00; B03C 1/00
[52] U.S. Cl. ................................ 423/321 R; 423/24; 423/87; 423/89; 423/100; 423/321 S
[58] Field of Search ................ 423/321 R, 320, 321 S, 423/87, 21.5, 22, 24, 49, 54, 63, 70, 87, 89, 100, 139

[56] References Cited

U.S. PATENT DOCUMENTS 4,226,791 10/1980 Reinhardt et al. ............. 423/100 X

FOREIGN PATENT DOCUMENTS

| 2447390 | 10/1977 | Fed. Rep. of Germany . |
| 3127900 | 2/1983 | Fed. Rep. of Germany . |
| 32026587 | 4/1983 | Fed. Rep. of Germany . |
| 49-37038 | 10/1974 | Japan .............................. 423/321 R |
| 56-120509 | 9/1981 | Japan .............................. 423/321 R |
| 791592 | 12/1980 | U.S.S.R. ......................... 423/321 R |

*Primary Examiner*—Gregory A. Heller
*Attorney, Agent, or Firm*—Connolly and Hutz

[57] ABSTRACT

The disclosure relates to a process for removing heavy metal ions and arsenic from wet-processed phosphoric acid, wherein the crude wet-processed phosphoric acid is treated at temperatures between 10° and 100° C. initially with a diorganyldithiosphosphoric acid ester and then with an adsorbent, and the phoshoric acid so purified is separated from the ester and adsorbent. More particularly, the wet-processed phosphoric acid is treated with the diorganyldithiophosphoric acid ester at temperatures higher than 50° C. and with the adsorbent at temperatures lower than 50° C.

3 Claims, No Drawings

PROCESS FOR REMOVING HEAVY METAL IONS AND ARSENIC FROM WET-PROCESSED PHOSPHORIC ACID

The present invention relates to a process for removing heavy metal ions and arsenic from wet-processed phosphoric acid wherein the crude wet-processed phosphoric acid is treated at temperatures between 10° and 100° C. initially with a diorganyldithiophosphoric acid ester and then with an adsorbent, and the phosphoric acid so purified is separated from the ester and adsorbent.

Crude phosphoric acids which are obtained by processing phosphate ores with a mineral acid are generally contaminated with heavy metal ions, e.g. cadmium, copper, lead and mercury ions, and also with arsenic ions.

It is often necessary for these phosphoric acids to be freed from the heavy metal ions and also from arsenic which may handicap the further uses the phosphoric acids are put to. In those cases in which the phosphoric acid is subjected, e.g. to extractive purification by means of an organic solvent, the arsenic is not co-separated so that the acid can naturally not directly be used in fields where food, detergents or cleaning agents are concerned.

A process normally used for separating arsenic from phosphoric acid comprises precipitating the arsenic in the form of arsenic sulfide by means of an excess of hydrogen sulfide (cf. German Patent Specification DE-AS No. 24 47 390).

In this process, it is necessary for the crude acid to be treated with a large excess of an alkali metal sulfide solution in a suitable reactor, e.g. a gas treatment column, and to be freed from $H_2S$ in excess by stripping with an inert gas. To filter resulting fine particulate arsenic sulfide, it is invariably necessary to use a filter aid. On the other hand, the large quantity of hydrogen sulfide gas set free makes it necessary for the entire reactor to be gas-tight.

All processes described heretofore for separating arsenic as arsenic sulfide use expensive apparatus, involve expensive consumption of material and are potentially hazardous because of the large quantities of $H_2S$ set free. Cadmium can incidentally not be separated in this way.

Attempts have therefore been made (cf. German Pat. Application No. P 31 27 900.7) by subjecting phosphoric acids previously freed from emulsion-forming material to liquid/liquid extraction with the aid of a diorganyldithiophosphoric acid ester to separate the heavy metals jointly with arsenic. Indeed however the latter (arsenic) is only partially removed.

It has also been suggested (cf. German Patent Application No. P 32 02 658.7 that crude, so-called "black" wet-processed phosphoric acids should be freed from heavy metal ions by contacting the acids at temperatures between 10 and 100° C. either with a mixture consisting of an adsorbent and an organyldithiophosphoric acid ester or, after treatment of the acid with the ester, with the adsorbent alone, the acid so purified being separated from the ester and adsorbent.

As has been found, however, the heavy metal ions (cadmium, copper, lead and mercury) on the one hand and arsenic on the other cannot equally effectively be removed.

This adverse effect can unexpectedly be readily avoided by the process of this invention which provides for the wet-processed phosphoric acid to be initially treated with the diorganyldithiophosphoric acid ester at temperatures higher than 50° C., preferably between 55° and 75° C., and then to be treated with the adsorbent at temperatures smaller than 50° C., preferably between 25° and 40° C.

The quantities of dithiophosphoric acid ester and adsorbent needed depend on the particular crude phosphoric acid used. It is generally sufficient to use 0.5–0.3% ester and 0.1–2% adsorbent, each time based on the weight of the phosphoric acid. Each of the two treatment steps should be effected over a period of at least 15 minutes, preferably 30 to 60 minutes.

The useful diorganyldithiophosphoric acid esters include those of the general formula $(RO)_2PSSH$, in which R stands for alkyl, cycloalkyl, alkenyl, a substituted alkyl, aryl, alkaryl or aralkyl. It is especially advantageous to use those which contain 4 to 12 carbon atoms in the alkyl group. The adsorbents can be selected from practically all solid materials capable of retaining the thioester/heavy metal mixture from the phosphoric acid emulsion in a filter cake. These solid materials include more particularly silicate material, such as kieselguhr, perlite or synthetic silicic acid, but also adsorbents which essentially consist of carbon, such as active carbon or carbon black.

The following Examples illustrate the invention which is naturally not limited thereto:

The reaction was in each case effected in two separately heatable, agitator-provided reactors in cascade arrangement, the liquid matter running off the bottom of each reactor via a siphon. Each reactor had a volume of 1 liter. The first reactor was supplied per hour with 2 l crude phosphoric acid and with a predetermined proportion of dialkyldithiophosphoric acid ester $(RO)_2PSSH$; the second reactor was supplied discontinuously at intervals of 5 minutes with a defined proportion of adsorbent. The resulting suspension was given on to a vacuum suction filter 20 cm in diameter and separated into solid matter and purified phosphoric acid. The filtrate obtained was in each case free from dithiophosphoric acid ester.

The results obtained are summarized in the following Table.

Data typical of the crude acids used:

|  | Examples 1 to 4 | Examples 5 to 7 |
|---|---|---|
| Wgt % $P_2O_5$ | 50.3 | 51.2 |
| Wgt % $SO_4$ | 0.7 | 2.1 |
| ppm $C_{org.}$ | 190 | 450 |
| ppm Cd | 22 | 25 |
| ppm As | 9 | 11 |

As can be seen from comparative Examples 1 and 2, the deconcentration either of heavy metal ions or arsenic is unsatisfactory at identical temperature in the two reactors.

| Example | Quantity thioester (ml/h) | Adsorbent | Quantity (g/h) | Temperatures (°C.) Reactor 1 | Reactor 2 | ppm in purified acid (filtrate) Cd | As | $C_{org.}$ |
|---|---|---|---|---|---|---|---|---|
| 1 | 3 | Kieselguhr | 16 | 60 | 60 | 7 | <1 | 200 |
| 2 | 5 | Kieselguhr | 32 | 20 | 20 | <1 | 5 | 190 |
| 3 | 3 | Kieselguhr | 16 | 60 | 30 | 1 | <1 | 180 |
| 4 | 4 | Perlite | 24 | 70 | 35 | <1 | <1 | 190 |
| 5 | 5 | Perlite | 32 | 70 | 35 | <1 | <1 | 330 |
| 6 | 5 | Kieselguhr | 32 | 60 | 30 | <1 | 1 | 360 |
| 7 | 5 | Kieselguhr | 32 | 60 | 30 | 1 | <1 | 340 |

Tests 1–5: R in $(RO)_2PSSH$ = 2-ethylhexyl
Test 6: R in $(RO)_2PSSH$ = i-amyl
Test 7: R in $(RO)_2PSSH$ = n-dodecyl

We claim:

1. A process for removing heavy metals and arsenic from crude wet-process phosphoric acid, which comprises: treating the crude wet process phosphoric acid with a diorganyldithiophosphoric acid ester at temperatures within the range of 55°–75° C.; subsequently treating the thus treated phosphoric acid with a solid silicate or carbon adsorbent at a temperature within the range of 25°–40° C.; and, recovering the thus purified phosphoric acid.

2. The process as claimed in claim 1, wherein the diorganyldithiophosphoric acid ester is a compound of the formula $(RO)_2PSSH$, wherein R represents $C_4$–$C_{12}$ alkyl or substituted alkyl.

3. The process as claimed in claim 1, wherein the adsorbent consists essentially of Kieselguhr, perlite, synthetic silicic acid, active carbon, or carbon black.

* * * * *